United States Patent

Herrington et al.

[11] Patent Number: 4,656,791
[45] Date of Patent: Apr. 14, 1987

[54] ABRASIVE FLUID JET CUTTING SUPPORT

[75] Inventors: Richard A. Herrington, Walbridge; Thomas G. Kleman, Northwood; Ermelinda A. Apolinar, Toledo, all of Ohio

[73] Assignee: Libbey-Owens-Ford Company, Toledo, Ohio

[21] Appl. No.: 654,975

[22] Filed: Sep. 27, 1984

[51] Int. Cl.[4] .............................................. B24C 3/04
[52] U.S. Cl. ....................................... 51/410; 51/235; 51/321; 51/240 GB; 269/21
[58] Field of Search ............ 51/410, 417, 235, 165.72, 51/283 R, 319, 321, 240 GB; 269/21; 266/58–65; 83/53, 177, 451; 248/362, 363

[56] References Cited

U.S. PATENT DOCUMENTS

| 750,667 | 1/1904 | Lewellyn et al. | 51/235 X |
|---------|--------|-----------------|----------|
| 1,851,028 | 3/1932 | Worrall | 51/235 X |
| 2,379,054 | 6/1945 | Zuk | 51/235 |
| 2,538,972 | 1/1951 | Magnani | 144/278 A |
| 2,985,050 | 5/1961 | Schwacha | 51/410 |
| 3,366,857 | 1/1968 | Jewell et al. | 266/60 |
| 3,877,334 | 4/1975 | Gerber | 83/53 |

Primary Examiner—Frederick R. Schmidt
Assistant Examiner—Robert A. Rose
Attorney, Agent, or Firm—Marshall & Melhorn

[57] ABSTRACT

A support apparatus for supporting a workpiece in a high velocity fluid jet cutting operation. The apparatus has particular utility in the Abrasive cutting of frangible sheet material, such as glass, and especially in the cutting of a predetermined pattern from the sheet thereof. The support apparatus comprises a pair of independent support members that cooperate to provide uniform support to the entire area of the sheet during cutting. A first support member, comprising a plate which is relatively large with respect to the sheet, includes a central opening therein conforming to and slightly larger than the pattern being cut. The plate member provides support to the peripheral portion of the sheet while the central portion thereof is supported by a second support member positioned within the opening. The second support member includes a plurality of vacuum heads disposed inwardly of the edges of the opening for securely gripping the sheet, with each of the vacuum heads being independently adjustable to facilitate alignment with the first support member.

9 Claims, 5 Drawing Figures

ABRASIVE FLUID JET CUTTING SUPPORT

BACKGROUND OF THE INVENTION

The present invention relates to pattern cutting of sheet material by means of a high velocity abrasive fluid jet, and more particularly, to a novel apparatus for supporting a glass sheet or blank during the cutting thereof.

The use of a high velocity fluid jet for cutting, drilling and abrading various materials is well-known in the art. The system employed generally comprises a source of high pressure fluid, such as a high pressure intensifier, for pressurizing the fluid in a chamber to a very high level (e.g., on the order of 50,000 PSI or more), a conduit to transport the fluid to the cutting location, and a nozzle with a very small orifice (e.g., 0.001–0.040 inch; 0.025–1.016 mm) through which the liquid is discharged in the form of a high velocity, small diameter cutting jet. The resulting jet is a highly collimated stream with very little dispersion that produces a relatively narrow kerf with a small volume of waste.

The process has been used successfully to provide a clean cut through a wide variety of soft materials such as plastic, wood and fibers, as well as some relatively hard materials as rock and metal alloys. It is also known to add abrasives, for example, silica sand, garnet, and the like, to the high velocity fluid jet to cut through some hard and brittle material, especially certain metals, ceramics, glass, etc., which cannot be cut using the conventional fluid jet.

In order to absorb the force or impact of the high velocity fluid jet it is necessary to provide a firm support for the material being cut. This is particularly important when making precision cuts in sheet-like articles or workpieces. Even the slightest movement of the sheet can cause a cut to deviate from the intended path, resulting in a defective cut. In the majority of cutting and drilling operations, the fluid jet penetrates completely through the thickness of the workpiece and into the support surface therebelow. This will, of course, have an erosive effect on the support surface. Repeated penetrations of the jet stream, randomly or especially in a recurring pattern, will wear away portions of the surface until eventually it no longer provides the firm support needed and has to be replaced. For the above reasons, such sheets are generally supported on an expendable or "sacrificial" plate, mounted on a rigid supporting frame, that can be replaced when the need arises. Support plates of plywood, Plexiglass ®, and the like, have served this need adequately in the past, especially when using a conventional water jet system. However, with the use of abrasives entrained in the fluid jet to increase cutting capabilities, the useful life of the sacrificial plates is appreciably shortened, requiring more frequent replacement. Although the plates are relatively inexpensive in themselves, the routine replacement, and consequent downtime and labor involved, add considerably to the cost of the operation.

Also, it has been found extremely critical when cutting certain fragile sheet materials, e.g., glass and some plastics, that the sheet be uniformly supported adjacent either side of the line of cut. This is to prevent the sagging of one side below the other during the cutting operation, creating undesirable stresses at the point of penetration of the liquid jet which can result in so-called vents or cracks along the finished edge. Even the smallest vents barely visible to the naked eye may be unacceptable, especially when the material is glass which is to undergo subsequent heat treatment for use in the automotive or architectural markets. Such heat treatment may include bending and/or annealing or tempering, and as is well known, when a vented glass sheet is exposed to such treatment, there exists a strong possibility the vent will spread and destroy the sheet. The loss of sheets, especially at this late stage of production, adds considerably to the overall costs and thus should be controlled as much as possible. Should a vented sheet survive the heat treatment and enter the market place there is the ever present danger that it may fracture on impact or even due to exposure to radiant heat from the sun. Under such conditions, tempered lights have been known to spontaneously fracture, or disintegrate with force, due to the release of residual stresses therein and scatter particles in all directions. Thus, the importance of providing vent-free glass sheets can readily be understood.

The aforementioned sacrificial plate employed heretofore has generally been mounted on a plurality of accurately aligned and closely spaced metal cross beams to provide a firm, level support surface for the sheet to be cut. While this structure initially provides adequate support, continued use and prolonged exposure to the fluid may produce temperature differentials in the support plate causing it to warp and develop an undulating or uneven support surface. Prolonged exposure to the fluid alone may have the same effect on some plates, such as the plywood frequently used. As previously mentioned, an uneven support surface has an adverse effect on the quality of the cut, particularly when the material is a sheet of glass.

Another area of concern exists when utilizing an abrasive fluid jet for cutting transparent sheets of glass and plastic that must meet stringent optical requirements. This can include glazing closures for buildings, aircraft, automobiles and the like, wherein the viewing area of the closure or window must be free of optical defects that would tend to interfere with clear viewing therethrough. As previously mentioned, the sheets are supported on the top surface of a sacrificial plate during the cutting operation and the cutting medium after penetrating through the sheet, will cut into the surface of the support plate. As the abrasive-containing fluid strikes the support plate, there will be a certain amount of splash-back or rebound of the abrasive material against the bottom surface of the glass, creating an undesirable gray or frosted area adjacent the line of cut. This frosted area is especially pronounced when the abrasive jet penetrates completely through the support plate and ricochets off one of the metal reinforcing beams immediately therebelow. Depending on the severity of the frosting, the glazing closure may not meet specified optical requirements and thus may be considered unacceptable.

SUMMARY OF THE INVENTION

The present invention overcomes the aforementioned problems by providing an apparatus for supporting a sheet uniformly and securely throughout its areal extent in a fluid jet pattern cutting operation, and which apparatus may be used repeatedly for cutting the same pattern without detriment to its supportive characteristics. The apparatus includes a planar support with an opening therein conforming to, and slightly larger than, the outline of the particular pattern being cut. A vacuum stand, independent of the support plate and positioned wtihin the opening, includes a plurality of vertically adjustable vacuum heads for securely holding the sheet during the cutting operation. When cutting a pattern from a block size sheet or blank, the support plate provides support for the selvedge portion of the blank outside the line of cut, while the vacuum stand provides support for the central or pattern portion inside the line of cut. The adjustable feature permits accurate alignment of the vacuum heads with the planar support plate to assure uniform support of the sheet and reduce the potential for harmful vent-producing stresses therein.

Therefore, it is a primary object of the present invention to provide a novel apparatus for supporting a sheet during high velocity fluid jet cutting.

Another object of the invention is to provide an apparatus of the above character that provides an unobstructed path for the fluid jet as it passes through the sheet.

Another object of the invention is to provide an apparatus of the above character including a pair of cooperating independent support members for maintaining the sheet on both sides of the cut in a common plane so as to provide uniform support thereto during the cutting operation.

Still another object of the invention is to provide an apparatus of the above character wherein one of the support members includes vacuum means for gripping the sheet and an adjustment means for aligning the two support members.

Yet another object of the invention is to provide an apparatus of the above character that is capable of repeated use in reproducing a pattern without detrimental effect to its supportive characteristics.

Other objects and advantages will become more apparent during the course of the following description when taken in connection with the accompanying drawings.

DESCRIPTION OF THE INVENTION

Figure 1:
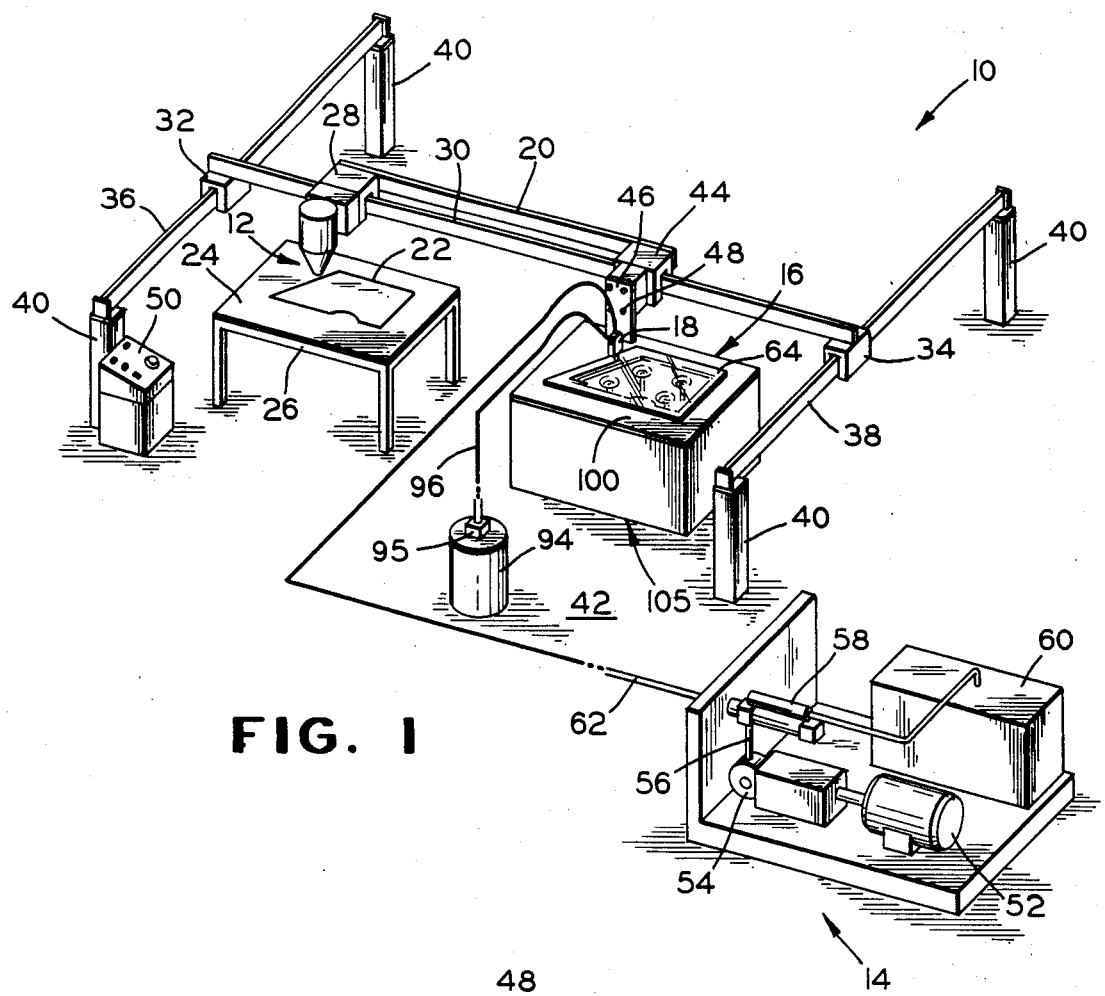
FIG. 1 is a schematic perspective view of a pattern cutting system for glass sheets including an abrasive fluid jet cutting apparatus embodying the novel sheet support system of this invention.

Referring now in detail to the drawings, there is illustrated in FIG. 1 a glass sheet pattern cutting system, comprehensively designated 10, that includes an optical tracer apparatus 12 and an abrasive fluid jet cutting apparatus, generally designated 14. The cutting apparatus 14 includes a novel sheet support system 16 constructed in accordance with the invention as will be hereinafter more fully described. While the invention will be described in connection with the particular pattern cutting system depicted in the drawings, it should be understood that the sheet support system 16 of this invention is not restricted to use with such a system, but also has utility with other pattern cutting apparatus familiar to the cutting industry. It conveniently can be utilized in conjunction with a template or cam-and-follower arrangement as are commonly used for repetitively cutting a particular pattern, as well as with robots and computer operated programs.

In the illustrated embodiment, the fluid jet cutting apparatus 14 includes a discharge or nozzle assembly 18 as will be hereinafter more fully described, mechanically connected to the optical tracer 12 by means of a tie bar 20. The tracer, although not restricted thereto, is of the photocell type and, as will be explained, is provided for guiding the movement of the nozzle assembly 18 in accordance with a template or pattern 22 on a plate member 24 mounted on a table 26. The optical tracer 12 is affixed to a carriage 28 slidably mounted on an elongated transverse track 30 which is suitably equipped at its opposite ends with a pair of carriages 32 and 34. The carriages 32 and 34 are slidably mounted on parallel tracks 36 and 38, respectively, supported by stanchion members 40 on floor 42. The nozzle assembly 18 is affixed to a carriage 44 in any convenient manner such as by a plate 46 and fasteners 48. The carriage 44 is rigidly connected in a spaced relationship to the carriage 28 by the tie bar 20. The spacing between the carriages 28 and 44 is determined such that the optical tracer 12 and the nozzle assembly 18 overlie the plate 24 and the substrate support 16, respectively. The carriages 28, 32, 34 and 44 do not constitute part of the present invention and therefore are illustrated schematically for the sake of simplicity Thus, it will be appreciated, that with the above described carriage system the tracer 12 is capable of movement in any direction longitudinally, laterally or diagonally, with the carraige 44 and nozzle assembly 18 compelled to follow the same motion due to the union of the carriages 28 and 44 by the tie bar 20 and the track 30. Basically, in operation, as the tracer 12 follows the outline or pattern 22 on the plate member 24, the fluid jet cutting nozzle 18, via carriage 44, is caused to move correspondingly over the sheet support 16. Control of the tracer functions such as, on/off power, speed, automatic and non-automatic operation, etc., can be effected as from a control panel 50.

The overall fluid jet cutting apparatus 14 is shown schematically in FIG. 1 and includes an electric motor 52 which drives a hydraulic pump 54, which in turn supplies working fluid through a conduit 56 to a high pressure intensifier unit 58. The function of the intensifier unit 58 is to draw in fluid (for example, deionized water) from a suitable source, such as a resservoir 60, and place it under a very high pressure, generally in excess of 10,000 PSI, for discharge through a conduit 62. Mounted at the discharge end of the conduit 62 is the nozzle assembly 18 which directs a very high velocity, small diameter fluid jet against a glass sheet 64 supported by the sheet support assembly 16.

Figure 3:
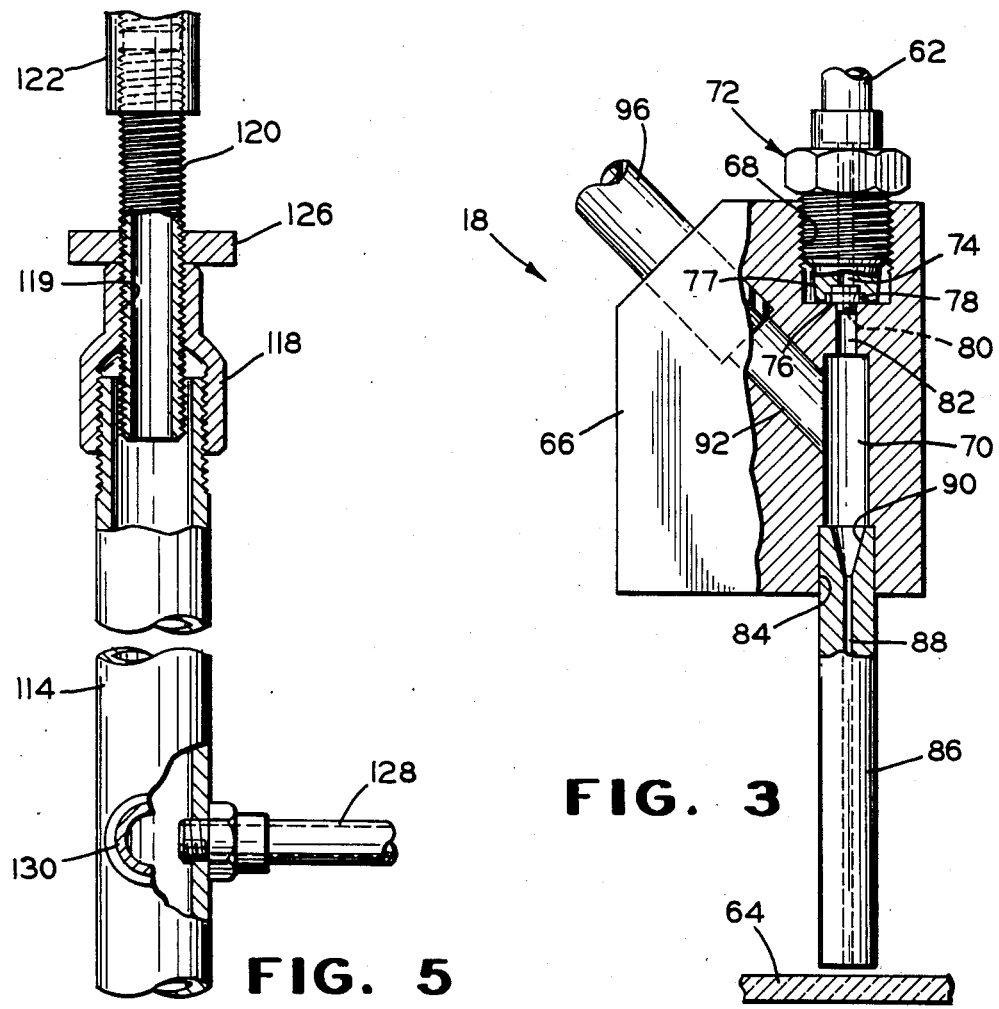
FIG. 3 is an enlarged side elevational view, partly in section, of the jet nozzle.

With reference to FIG. 3, the nozzle assembly 18 comprises a generally rectangular housing 66 having a threaded bore 68 at its upper end axially aligned with a flow passageway 70 extending through the housing. An externally threaded connector 72 having a flow passageway 74 extending therethrough, is suitably attached to the discharge end of the conduit 62 for connecting the conduit to the housing. A recess 76 is provided in a boss 77 at the threaded end of the connector 72 within which is mounted a fluid jet orifice 78 having a discharge opening 80 of very small diameter (e.g., 0.003–0.014 inch; 0.07–0.35 mm). When securely threaded in the bore 68, the connector 72 properly seats the orifice 78 in the upper, reduced diameter portion 82 of the flow passageway 70. The lower end of the passageway 70 includes an enlarged diameter portion 84 for receiving a nozzle or mixing tube 86. The tube, as illustrated in the drawings, is frictionally held in the flow passageway as by a press fit, but it should be understood that this is not meant to be limitative in any respect, and any convenient means may be utilized to secure the tube therein. The nozzle tube 86 includes a relatively small diameter (e.g., 0.035–0.125 inch; 0.88–3.17 mm) longitudinal passageway 88 with an outwardly flared entrance opening 90 for more readily receiving the jet stream from the orifice 78.

Obliquely oriented to the passageway 70 is a bore 92 for delivering abrasive material such as sand, garnet or the like, into the path of the fluid jet stream. A regulated supply of the abrasive is carried from a storage container 94 and regulator 95 to the bore 92 by means of a flexible conduit or carrier tube 96 (FIG. 1). The abrasive material is aspirated into the fluid jet stream as the stream passes through the passageway 70, wherein it is mixed and accelerated into the high pressure stream prior to entering the passageway 88 in the nozzle tube 86. In operation, the exit end of the tube 86 is generally positioned relatively close to the workpiece, e.g., 0.030–0.250 inch (0.76–6.35 mm) therefrom, in order to minimize dispersion of the jet stream and thus provide a minimum kerf width. It should be appreciated that the aforedescribed nozzle assembly is only intended to be representative of those utilized in the industry, and the invention is not limited thereto.

As was previously mentioned, a sacrificial plate has been used successfully to adequately support a variety of articles during a high velocity fluid jet cutting operation. However, with the use of abrasives, the useable life of the sacrificial support plate is diminished to the extent that it is not practical in many production-type operations. This is especially true in a high volume operation such as the production of automotive glass, wherein a single part, such as a window, is continuously reproduced in relatively large numbers (generally in the thousands) in a cutting operation. The use of an abrasive cutter with the prior art sacrificial support plate in such an operation would result in frequent interruptions to the operation for routine replacement of the sacrificial plate. As will be readily appreciated, these interruptions reduce the yield and have an adverse effect on the overall cost of production.

The present invention provides an improved support apparatus for securely and uniformly supporting a sheet article throughout its areal extent during a fluid jet cutting operation, the support apparatus being capable of repeated use without any adverse effect to its supporting qualities. The apparatus has particular utility in the abrasive cutting of fragile glass sheets and although not limited thereto, will be described in connection with the cutting of an automotive window or light from a suitable glass blank.

Figure 2:
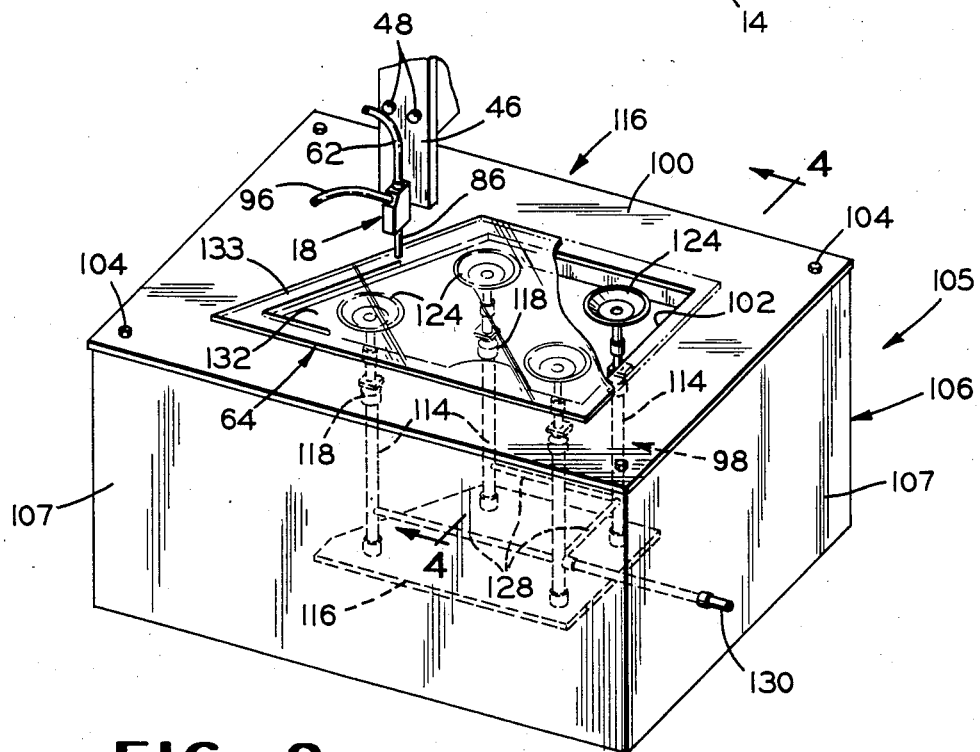
FIG. 2 is an enlarged perspective view of the jet nozzle and the sheet support system illustrated in FIG. 1, with portions broken away for the sake of clarity.
Figure 4:
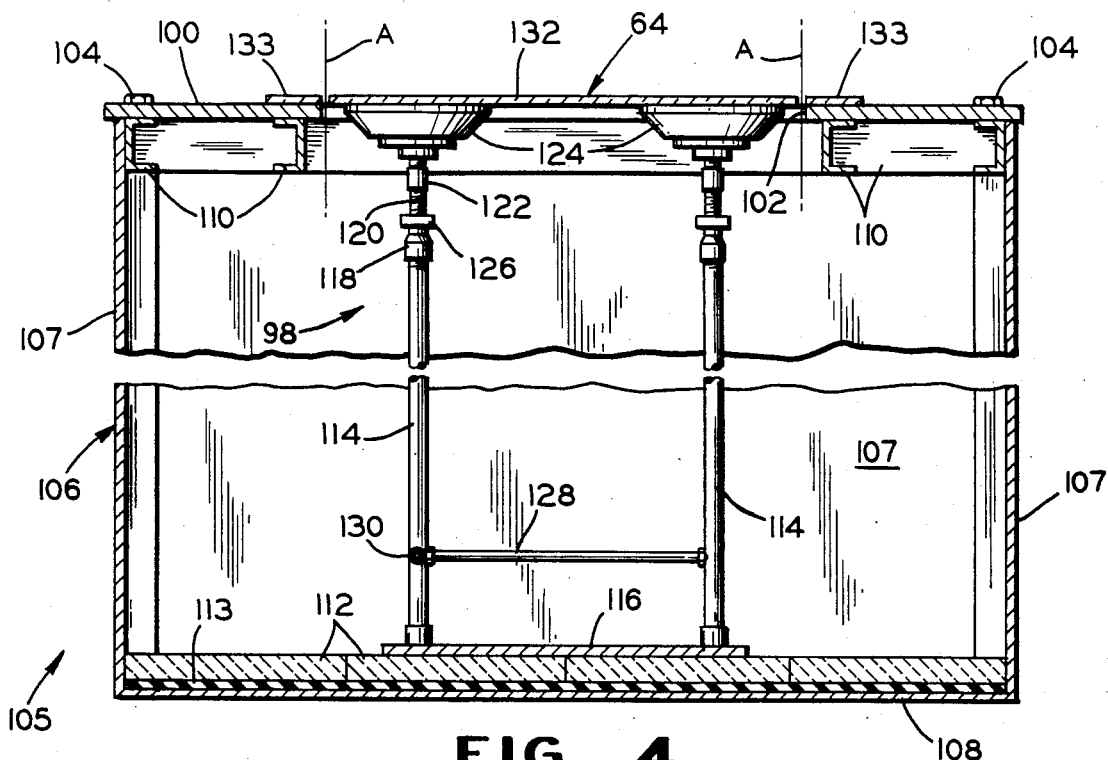
FIG. 4 is a sectional view taken along 4—4 of FIG. 2.

As best shown in FIGS. 2 and 4, the support apparatus 16 includes a vacuum stand 98 and a plate member 100 having a suitable opening 102 therein as will be explained in more detail hereinafter. The plate member 100 is detachably secured, as by bolts 104, to the open upper end of a catcher or waste tank 105 which confines and collects the spent abrasive and fine glass debris resulting from the cutting process. The tank 105 is in the form of an open box-like structure 106 having sidewalls 107 and a bottom wall 108. A aplurality of accurately aligned structural members 110 affixed at the upper, open end provide proper support for the plate member 100. The central portion of the tank is maintained free of the structural members 110 so as to not interfere with the vacuum stand 98 or the path followed by the fluid jet, shown as a broken line A in FIG. 4. To counteract the force and erosive nature of the abrasive material and to provide sound deadening characteristics, the bottom wall 108 of the tank 105 is lined as with alumina tiles 112 cushioned or backed by a resilient rubber mat 113. The tiles, for example, may be on the order of one inch (25.4 mm) thick and the rubber mat one fourth inch (6.4 mm) thick. The thickness and composition of the tiles and mat are suggested as exemplary and may be revised as indicated by experience without departing from the spirit of the invention.

Figure 5:
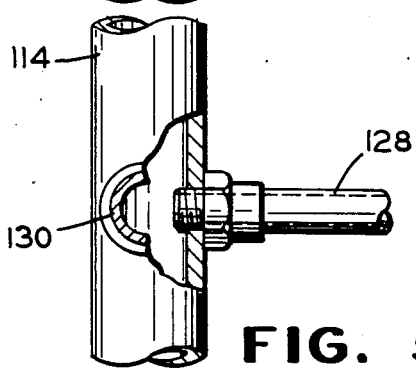
FIG. 5 is an enlarged fragmentary elevational view, partly in section, of one of the adjustable posts of the novel sheet support system of this invention.

The vacuum stand 98, comprising a plurality of hollow, tubular posts 114 mounted on a planar base member 116, is positioned within the tank 105 with the base member resting on the bottom tiles 112. As best illustrated in FIGS. 2, 4 and 5, a reducer 118 is suitably secured, as by threading, to the upper or distal end of each post 114. Each reducer 118 includes an internally threaded portion 119 for receiving an externally threaded tubular adjustment member 120. The free end of each adjustment member 120 includes a coupling element 122 to facilitate the securing of a vacuum head 124 thereto. Thus, it can readily be understood by the simple manipulation of the adjustment member 120, i.e., threading it axially into or out of the reducer member 118, the vacuum head 124 may be raised or lowered permitting precise vertical alignment of the vacuum head 124 with respect to the support member 100. A locking nut 126 is provided for securely locking the vacuum head at the desired elevation. The hollow posts 114 are joined by tube members 128 in common communication with a vacuum line 130 connected to a source (not shown) of negative air pressure or vacuum to thus provide a source of vacuum to the heads 124.

Although the vacuum stand 98 is illustrated as having four of the vacuum heads 124, it should be understood that the number and arrangement or spacing of the heads may vary as determined by the particular article being cut. It is extremely important that adequate support be provided when cutting certain fragile materials, such as glass, to eliminate the potential for undesirable stresses therein. As previously mentioned, stresses caused by non-uniform support of a glass sheet can induce venting which may result in either instant destruction of the sheet or the eventual destruction thereof due to subsequent processing operations.

It is important that the support plate 100 be of a durable material with sufficient thickness and rigidity to enable it to tolerate continuous exposure to moisture and the heat generated by the cutting action without corrosion or warpage. A one half inch (12.7 mm) thick aluminum plate has fulfilled these requirements admirably. Such a plate also has the advantage of being relatively light in weight so as to facilitate handling. The opening 102 in the support plate 100 should conform substantially to and be slightly larger than the outline of the article being cut. The slightly larger overall dimension of the opening 102 assures maximum support to the outer perimeter of the substrate 64 without obstructing the path of the fluid jet A (FIG. 4).

In a typical operation, e.g., cutting an automotive door light from a block size sheet or blank, a plate member 24 having an outline or pattern 22 corresponding to the part being processed, is placed on the table 26 below the optical tracer 12. A support plate 100 having a suitable opening 102 conforming to the standards just described, i.e., slightly larger than the desired part, is fastened to the top of the waste tank 105. The vacuum stand 98 is centered within the opening 102 and the individual vacuum heads 124 are axially adjusted into alignment with the upper surface of the plate 100. Thus, the vacuum stand 98 and plate 100 cooperate to create a planar support surface that provides uniform support throughout the entire area of the sheet supported thereon. The sheet 64, which in this particular operation is a block size glass sheet, is centered over the opening 102 and the vacuum system is activated whereupon the vacuum heads 124 attach themselves to the sheet surface to securely hold the sheet in place.

The desired controls are then activated to energize the cutting apparatus 14 and the tracer 12. Upon energizing in an automatic mode, the tracer 12 commences to follow the outline 22 of the plate 24. As previously noted, the nozzle assembly 18 is mechanically linked to the tracer and will thus simultaneously follow the same pattern, cutting into the sheet 64 as it proceeds. The speed of the tracer and the nozzle, together with fluid pressure and abrasive feed, are regulated so that the abrasive stream penetrates completely through the sheet and separates it into two distinct parts, a central portion 132 (door light or article) and an outside portion 133 (selvedge). Notwithstanding the substantial difference in the size and weight of these portions, uniform support is provided by the novel support apparatus of the invention so as to preclude any sagging between the portions thereof and minimize the potential for damaging stresses therein. Upon completion of the cutting cycle, the controls are deactivated and the outer selvedge portion and the "cut size" door light are removed from the supporting apparatus.

The support apparatus is designed so that neither of the cooperating support members, i.e., the vacuum stand 98 and the plate 100, lies in the path of the abrasive fluid jet. Thus, there is no erosion of the support members and they may be used repeatedly without detriment to their supportive characteristics. Also, since the path of the abrasive fluid jet is free of obstructions, "splash back" of the abrasive material against the bottom surface of the workpiece is avoided, eliminating the undesirable frosting thereof, which is especially critical when cutting certain transparent materials.

It is to be understood that the form of this invention herewith shown and described is to be taken as an illustrative embodiment only of the same, and that various changes in the shape, size and arrangement of the parts as well as various procedural changes, may be resorted to without departing from the spirit of the invention.

We claim:

1. A fluid jet cutting system including apparatus for supporting a sheet from which a pattern is to be cut by abrasive particles entrained in a fluid jet stream directed against the sheet from a nozzle, said nozzle being adapted to follow a path along said sheet describing said pattern, said sheet comprising a peripheral portion lying outwardly of said path and a central portion inwardly of said path, comprising:

a catcher tank for collecting the fluid and spent abrasive and debris resulting from the cutting, said catcher tank comprising a box-like structure having side walls and a bottom wall with structural members at its open upper end defining a frame;

a first support member mounted on said frame, said first support member having a central opening therein generally similar to and larger than said pattern defined by said path and including an upper planar surface for supporting said peripheral portion of said sheet; and a second support member independent from said first support member comprising a vacuum stand supported upon said bottom wall of said catcher tank centrally of said opening for supporting said central portion of said sheet in substantially the same plane as said peripheral portion upon said upper planar surface of said first support member.

2. A fluid jet cutting system as defined in claim 1, wherein said vacuum stand includes at least one vacuum head spaced inwardly of the sides of said opening for grippingly supporting said second portion of said sheet.

3. In a fluid jet cutting system for cutting a predetermined pattern from a sheet by means of a fluid jet stream entraining abrasive particles directed against the sheet from a nozzle, including support means for said sheet, tracer means, a pattern to be followed by said tracer means, said nozzle following the path prescribed by said tracer means whereby said abrasive-entraining fluid jet stream cuts a corresponding path through said sheet, said sheet comprising a peripheral portion lying outwardly of said path and a central portion inwardly of said path, the improvement wherein said support means comprises:

a catcher tank for collecting the fluid and spent abrasive and debris resulting from the cutting, said catcher tank comprising an open box-like structure side walls and a bottom wall with structural members at its open upper end defining a frame;

a first support member mounted on said frame, said first support member having a central opening therein generally similar to and larger than said pattern defined by said path and including an upper planar surface for supporting said peripheral portion of said sheet; and a second support member independent from said first support member comprising a vacuum stand supported upon said bottom wall of said catcher tank and positioned centrally within said opening for supporting said central portion of said sheet in substantially the same plane as said peripheral portion upon said upper planar surface of said first support member.

4. A fluid jet cutting system as defined in claim 3, wherein said vacuum stand includes a plurality of vacuum heads disposed inwardly of the path cut through said sheet by said cutting means for grippingly supporting said central portion of said sheet.

5. A fluid jet cutting system as defined in claim 3, wherein said sheet is a sheet of frangible material.

6. A fluid jet cutting system as defined in claim 5, wherein said frangible material is glass.

7. A fluid jet cutting system including apparatus for supporting a sheet from which a pattern is to be cut by abrasive particles entrained in a fluid jet stream directed against the sheet from a nozzle, comprising:

a catcher tank for collecting the fluid and spent abrasive and debris resulting from the cutting;

a first support member mounted on said catcher tank and having an opening therein generally similar to and larger than the outline of said pattern, said first support member including an upper planar surface for supporting a first portion of said sheet outwardly of said pattern; and a second support member independent from said first support member comprising a vacuum stand having at least one vacuum head spaced inwardly of the sides of said opening for grippingly supporting a second portion of said sheet comprising said pattern in substantially the same plane as said first portion upon said upper planar surface of said first support member, said vacuum stand including means for adjusting the vertical disposition of said vacuum head relative to said upper planar surface.

8. In a fluid jet cutting system for cutting a predetermined pattern from a sheet by means of a fluid jet stream entraining abrasive particles directed against the sheet from a nozzle, including support means for said sheet, tracer means, a pattern to be followed by said tracer means, said nozzle following the path prescribed by said tracer means whereby said abrasive-entraining fluid jet stream cuts a corresponding path through said sheet, said sheet comprising a peripheral portion lying outwardly of said path and a central portion inwardly of said path, the improvement wherein said support means comprises:

a catcher tank for collecting the fluid and spent abrasive and debris resulting from the cutting, said catcher tank comprising an open box-like structure having side walls and a bottom wall with structural members at its open upper end defining a frame;

a first support member mounted on said frame, said first support member having a central opening therein generally similar to and larger than said pattern defined by said path and including an upper planar surface for supporting said peripheral portion of said sheet; and a second support member independent from said first support member comprising a vacuum stand carried by said bottom wall of said catcher tank and positioned within said opening for supporting said central portion of said sheet in substantially the same plane as said peripheral portion upon said upper planar surface of said first support member, said vacuum stand including a plurality of vacuum heads disposed inwardly of the path cut through said sheet by said cutting means for grippingly supporting said central portion of said sheet, and means for adjusting the vertical disposition of said vacuum heads.

9. A method for uniformly supporting a frangible sheet for cutting a pattern therefrom by abrasive particles entrained in a fluid jet stream directed against the sheet from a nozzle adapted to follow a path along said sheet describing said pattern, the fluid and spent abrasive and debris resulting from the cutting being received in a catcher tank comprising a box-like structure having a first support member with an upper, planar surface and a central opening therein generally similar to and larger than said pattern defined by said path, a bottom wall, and a second support member independent from said first support member comprising a vacuum stand supported upon the bottom wall of the catcher tank and positioned centrally within said opening, said sheet including a peripheral portion adapted to lie outwardly of said path and a central portion inwardly of said path, comprising supporting said sheet with its peripheral margin on said upper planar surface of said first support member around said central opening, supporting said central portion of said sheet upon said vacuum stand inwardly of said path and holding said central portion against said vacuum stand to secure said central portion against transverse movement and in substantially the same plane as said peripheral portion upon said upper planar surface of said first support member so that the portion of said sheet along said path is unsupported, and advancing said fluid jet along said path to cut through said sheet in said unsupported area whereby said peripheral margin is separated from said pattern.

* * * * *